(12) United States Patent
Teramoto (10) Patent No.: US 6,454,079 B1
(45) Date of Patent: Sep. 24, 2002

(54) VARIABLE-SPEED MOVING WALKWAY

(75) Inventor: Katsuya Teramoto, Numazu (JP)

(73) Assignees: Ishikawajima Transport Machinery Co., Ltd., Tokyo (JP); Tokai Rubber Industries Ltd., Komaki (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/880,113

(22) Filed: Jun. 14, 2001

(51) Int. Cl.[7] ............................................. B65G 23/00
(52) U.S. Cl. ...................................... 198/334; 198/792
(58) Field of Search ................................ 198/334, 792

(56) References Cited

U.S. PATENT DOCUMENTS

| | | | | |
|---|---|---|---|---|
| 1,671,207 A | * | 5/1928 | Parlongue ..................... | 198/334 |
| 3,712,448 A | * | 1/1973 | Burson et al. ................ | 198/334 |
| 3,903,806 A | * | 9/1975 | Ayres et al. .................. | 198/334 |
| 3,939,959 A | * | 2/1976 | Dunstan et al. .............. | 198/334 |
| 5,571,254 A | * | 11/1996 | Saeki et al. ................... | 198/334 |
| 6,044,955 A | * | 4/2000 | Stawniak ...................... | 198/334 |
| 6,065,583 A | * | 5/2000 | Hoashi et al. ............... | 198/334 |

* cited by examiner

*Primary Examiner*—Joseph E. Valenza
(74) *Attorney, Agent, or Firm*—Oblon, Spivak, McClelland, Maier & Neustadt, P.C.

(57) ABSTRACT

A variable-speed moving walkway includes an array of support rollers (10) provided with a plurality of horizontal drive rollers (11), having upper surfaces arranged to be generally flush with each other and rotated about each axial center, and an endless belt (16), supported by the array of support rollers, for moving continuously by their rotation. An array of accelerating rollers (12), an array of high-speed rollers (13), and an array of decelerating rollers (14) constitute the array of support rollers, and allow rotational speeds of the horizontal drive rollers to gradually increase from a low speed, to be maintained at a constant high speed, and to gradually decrease to a low speed, respectively. In addition, the endless belt (16) readily extends or retracts in the direction of movement and barely extendable or retractable in the widthwise direction. The belt (16) extends and retracts in the direction of movement in response to the rotational speed of the horizontal drive rollers.

5 Claims, 7 Drawing Sheets

VARIABLE-SPEED MOVING WALKWAY

BACKGROUND OF THE INVENTION

1. Field of the Invention

The present invention relates to a variable-speed moving walkway.

2. Description of the Related Art

Moving walkways, suitable for conveying passengers continuously, are installed in various places such as railway stations and airport terminals. Moving walkways are also used at other public facilities for the movement of pedestrians such as stadium concourses, connecting walkways, and indoor and outdoor sports facilities. Such moving walkways are divide a into pallet and belt types depending on the structure of tread boards. Furthermore, the belt type moving walkways include those in which the length of the belt is supported on each side by rollers (the roller support type), and those in which the entire lower surface of the belt is supported by planar members (the flat-plate support type).

Figure 1:
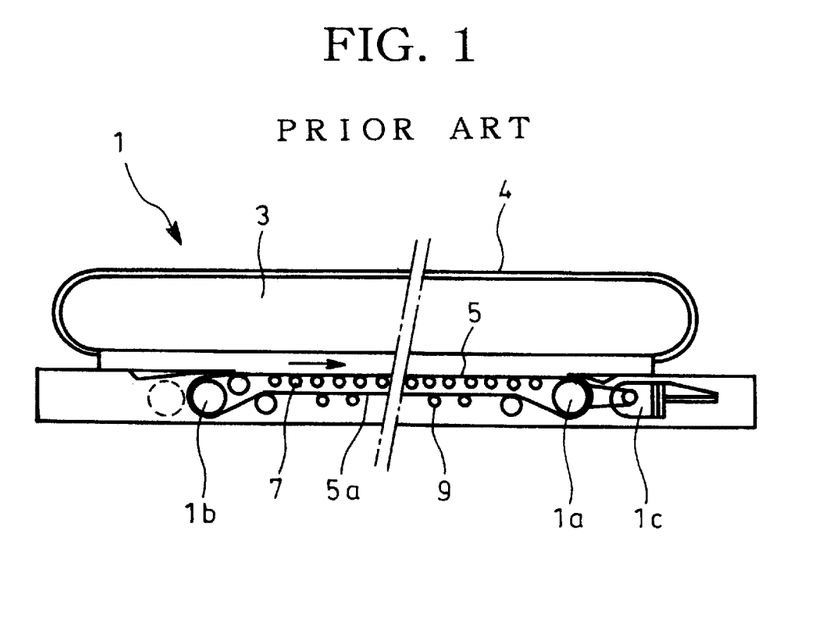
FIG. 1 is a side view illustrating a prior-art moving walkway.

FIG. 1 is a side view illustrating a belt-type moving walkway. With reference to FIG. 1, a moving walkway 1 of the roller support type includes a belt drive pulley 1a, a belt extending pulley 1b, a belt drive unit 1c, a moving handrail side panel 3, moving handrails 4, a belt 5, a return belt 5a, belt support rollers 7, and return belt support rollers 9. The endless tread board belt 5 is wound around the belt drive pulley 1a and the belt extending pulley 1b. The length of the belt 5 is supported on both sides by support rollers 7. Rotation of the belt drive pulley 1a drives the upper surface of the endless tread board belt 5 in the direction of movement of the moving walkway. At the same time the return belt 5a moves in the opposite direction. The belt extending pulley 1b is pushed away from the belt drive pulley 1a to prevent any slack in the belt. In addition, the moving handrail 4 is set to move along the upper surface of the moving handrail side panel 3 in phase with the belt 5.

Figure 2:
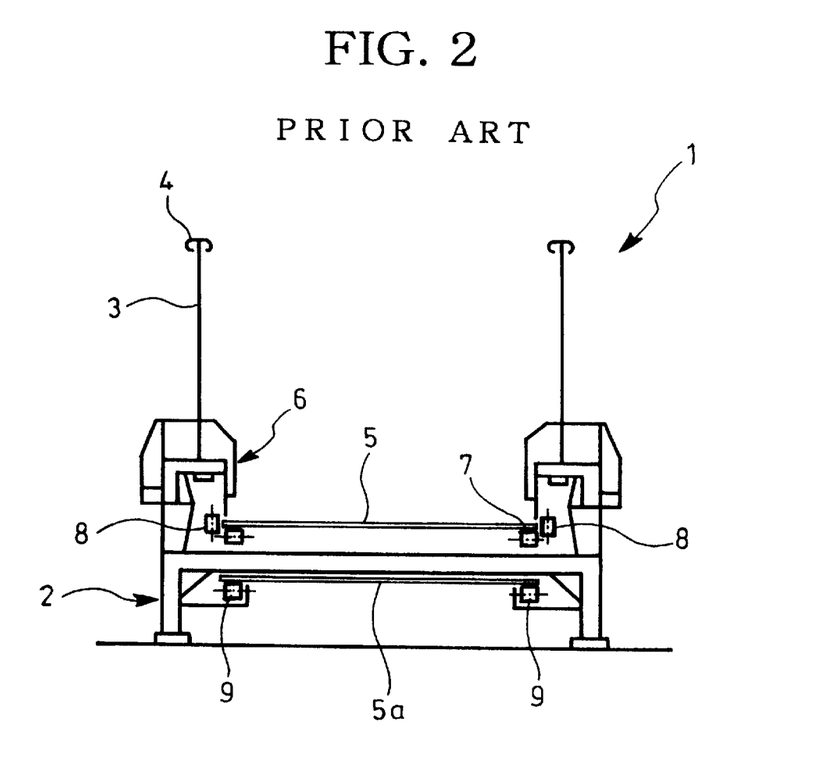
FIG. 2 is a cross-sectional view illustrating the prior-art moving walkway.

FIG. 2 is a cross-sectional view of FIG. 1, illustrating its center part. With reference to FIG. 2. reference numeral 2 denotes a frame of the moving walkway 1, 6 denotes skirt panels, and 8 denotes lateral guide rollers for the moving walkway 1. Between the belt 5 and the skirt panel 6 a space is provided to allow the belt 5 to rotate. A number of lateral guide rollers 8, in contact with both edges of the belt 5, are set to guide the belt 5 to prevent sideways movement of the belt. Incidentally, the main structure described above is the same for the flat plate support type moving walkway. As described above, the moving walkway has advantages in that it has a comparatively simple structure, it is easy to maintain, and it can be installed on a horizontal or inclined surface, In the prior-art the moving walkway operates at normal speeds of 30 to 40 m/min, This is to enable users to safely board and alight. However, this is only an operational speed of 1.8 to 2.4 km/h. Also, the design of the moving walkway only allows the same speed across the intermediate and entrance sections. This raised the problem that the speed of the moving walkway was less than the actual speed of walking. Consequently it would take a greater time for passengers to travel a certain distance on the walkway in comparison to walking the same distance. For this reason, a moving walkway which allows users to board and alight at low speed, at the entry and exit sections, and which moves the users at high speeds is desirable.

SUMMARY OF THE INVENTION

The present invention was developed to satisfy such a desire. It is therefore an object of the present invention to provide a variable-speed moving walkway which has a low speed across the entry and exit sections, and a high speed across the intermediate section.

The present invention provides a variable-speed moving walkway which includes an array of support rollers 10 with a plurality of horizontal drive rollers 11. The horizontal drive rollers 11 are arranged so that their upper surfaces are flush with each other and so that they can be rotated about their axial centers. In addition, the walkway has an endless belt 16, supported by the array of support rollers, which rotates continuously. The support rollers of the variable-speed moving walkway are composed of an array of accelerating rollers 12, an array of high-speed rollers 13, and an array of decelerating rollers 14. These rollers allow the rotational speed of the horizontal drive rollers to gradually increase from a low speed, to remain at a constant high speed, and then to gradually decrease to a low speed. The endless belt is extended or retracted in the direction of movement in response to the rotational speed of the horizontal drive rollers.

This configuration makes it possible to have a low speed at the entry and exit sections, and ensures a high level of safety. Safety is ensured by allowing passengers to board the endless belt 16 at the low speed side of the array of accelerating rollers 12, across which the rotational speed gradually increases, and by allowing passengers to alight from the endless belt 16 at the low speed side of the array of decelerating rollers 14, across which the rotational speed gradually decreases.

In addition, the endless belt 16 that moves at a high speed together with the array of high-speed rollers 13 can convey passenger several times (e.g., two to three times) faster than the moving walkway described in the prior art, except in the entry and exit sections. This makes the high speed transportation of passengers possible. Furthermore, the passenger boards the endless belt 16 and cannot directly board the array of support rollers 10. In this way it is possible to prevent the passenger from being caught in between a plurality of horizontal drive rollers 11 so alleviating the uncomfortable footing caused by the projected and recessed parts of the rollers.

According to a preferred embodiment of the present invention, the endless belt 16 includes elastic members 16a for extending or retracting in the direction of movement in response to the rotational speed of horizontal drive rollers. The endless belt 16 also includes rigid members 16b for preventing the elastic members from extending or retracting in a widthwise direction. The endless belt is readily extendable and retractable in the direction of movement but barely extendable and retractable in the widthwise direction. While rigid members 16b prevent extension and retraction in a widthwise direction, this configuration allows the elastic members 16a to extend and retract. In this way the uncomfortable feeling caused by variations in speed can be alleviated.

Furthermore, it is preferable an array of accelerating rollers, an array of high-speed rollers, and an array of decelerating rollers are arranged in that order, and a passenger boards an endless belt on the array of accelerating rollers, moves on the endless belt on the array of high-speed rollers, and then alights from the endless belt on the array of decelerating rollers. This configuration allows the passenger to board the array of accelerating rollers in the low-speed section, move on the array of high-speed rollers at a high speed, and then alight from the array of decelerating rollers at the low-speed section. This makes it possible to simultaneously provide safety at the entry and exit sections, and the high speed transportation of passengers.

Furthermore, it is preferable that the variable-speed moving walkway comprises the following: an entry side drive pulley 17a, provided at a boarding side edge part of the array of accelerating rollers and rotated at the same speed as that of the horizontal drive rollers at the boarding side edge part; an exit side drive pulley 17b, provided at an alighting side edge part of the array of decelerating rollers and rotated at the same speed as that of the horizontal drive rollers at the alighting side edge part; a pair of sustain rollers 18 to be rotated freely being pressed with a predetermined pressure by the entry and exit side drive pulleys. It is also preferable that the endless belt, while being sandwiched by the drive pulleys and the sustain rollers, rotates continuously between the entry and exit side drive pulleys. This configuration allows the endless belt 16 to be uniformly extended and retracted in the direction of movement by means of the drive pulleys 17a and 17b, thereby making it possible to reduce the fatigue of the endless belt and increase its longevity.

The horizontal drive rollers 11 have a plurality of increased-diameter parts 11a and a plurality of reduced-diameter parts 11b, arranged alternately in their axial directions. The increased-diameter part 11a has a larger diameter than a distance between axial centers of adjacent rollers and the reduced-diameter part 11b has a smaller diameter. In addition, the increased-diameter parts and the reduced-diameter parts of adjacent rollers are alternately arranged in the direction of movement. This configuration makes it possible to minimize the recesses formed between the upper surfaces of the rollers and thereby alleviates the uncomfortable footing caused by projected and recessed parts of the rollers.

DETAILED DESCRIPTION OF THE PREFERRED EMBODIMENTS

Now, the present invention will be explained below in more detail with reference to the accompanying drawings in accordance with the preferred embodiments. Incidentally, the same parts through the drawings are provided with the same reference symbols and will not be repeatedly explained.

Figure 3:
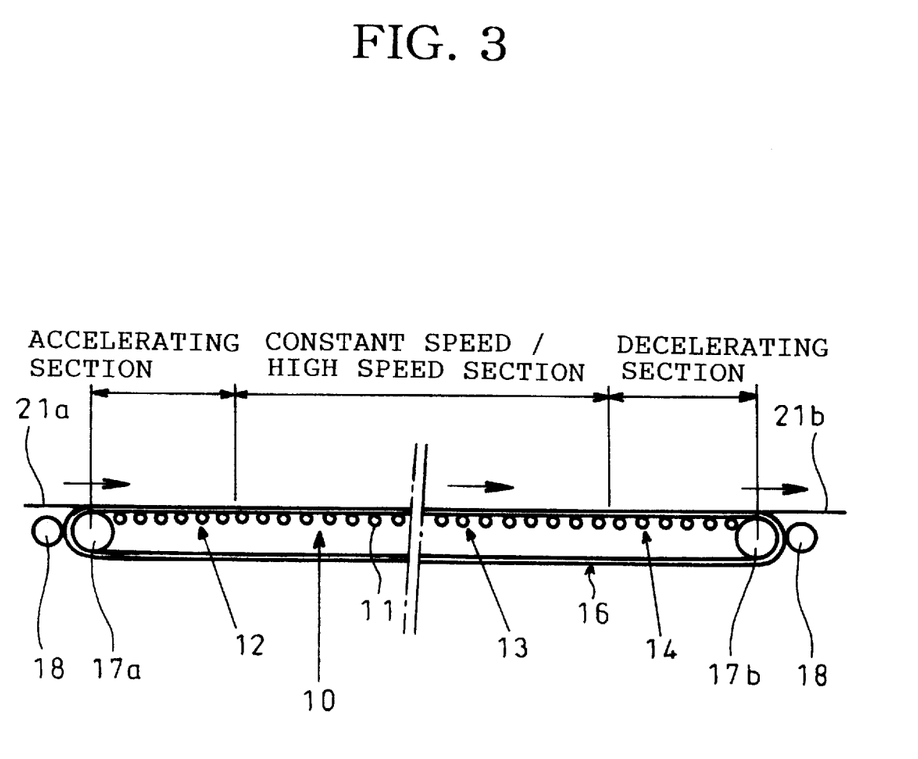
FIG. 3 is a view illustrating the overall configuration of a variable-speed moving walkway according to a first embodiment of the present invention.

FIG. 3 is a view illustrating the overall configuration of a variable-speed moving walkway according to a first embodiment of the present invention. As shown in this figure, the variable-speed moving walkway according to the present invention includes an array of support rollers 10 and an endless belt 16. The array of support rollers 10 is composed of a plurality of horizontal drive rollers 11. The horizontal drive rollers 11 are arranged so that their upper surfaces are flush with each other so that they can be rotated about their axial centers. In addition, the endless belt 16 is supported by the array of support rollers 10 and moved continuously by the rotation thereof.

Furthermore, the array of support rollers 10 includes an array of accelerating rollers 12, an array of high-speed rollers 13, and an array of decelerating rollers 14. These rollers allow the rotational speed of the horizontal drive rollers 11 to gradually increase from a low speed to a constant high speed (constant speed) and gradually decrease from the high speed to the low speed, respectively. In addition, the endless belt 16 is extended and retracted in the direction of movement in response to the change in speed.

Incidentally, the variable-speed moving walkway according to the embodiment illustrated in FIG. 3 is constructed in a straight line with the array of accelerating rollers 12, the array of high-speed rollers 13, and the array of decelerating rollers 14, which are arranged on a straight line from left to right in that order.

As shown in FIG. 3, the variable-speed moving walkway according to the present invention is also provided with an entry side drive pulley 17a, an exit side drive pulley 17b, and a pair of sustain rollers 18. The entry side drive pulley 17a is provided at the boarding side edge part (to the left end in the drawing) of the array of accelerating rollers 12 and rotated at the same speed as that of the horizontal drive rollers 11 on the boarding side edge part. In addition, the exit side drive pulley 17b is provided at the alighting side edge part (to the right end) of the array of decelerating rollers 14 and rotated at the same speed as that of the horizontal drive rollers 11 on the alighting side edge part. Furthermore, the pair of sustain rollers 18 are rotated freely while being pressed with a predetermined pressure by the entry and exit side drive pulleys 17a, 17b.

Incidentally, FIG. 3 shows the array of high-speed rollers 13 with a part of the high-speed section (constant speed section) thereof being cut away. This part can be made longer freely as required. On the other hand, in the drawing, a mechanism for preventing the endless belt 16 from loosening is not illustrated, however, the mechanism may be preferably provided on the return line (on the lower side in the drawing).

The aforementioned configuration makes it possible to continuously rotate the endless belt 16 between the entry and exit side drive pulleys 17a and 17b, while the endless belt 16 is being sandwiched in between the entry and exit side drive pulleys 17a, 17b and the sustain rollers 18. Accordingly, passengers can board the endless belt 16 on the array of accelerating rollers 12 from a walkway platform 21a in the entry section (to the left), then move on the endless belt 16 on the array of high-speed rollers 13, and then alight from the endless belt 16 on the array of decelerating rollers 14 to a walkway platform 21b (to the right). Thus, the passenger can aboard and alight at the entry and exit sections at a low speed, and can move across the intermediate part at a high speed. In addition, this configuration allows the endless belt 16 to be uniformly extended and retracted in the direction of movement by means of the drive pulleys 17a and 17b, thereby making it possible to reduce the fatigue of the endless belt and increase its longevity.

Figure 4:
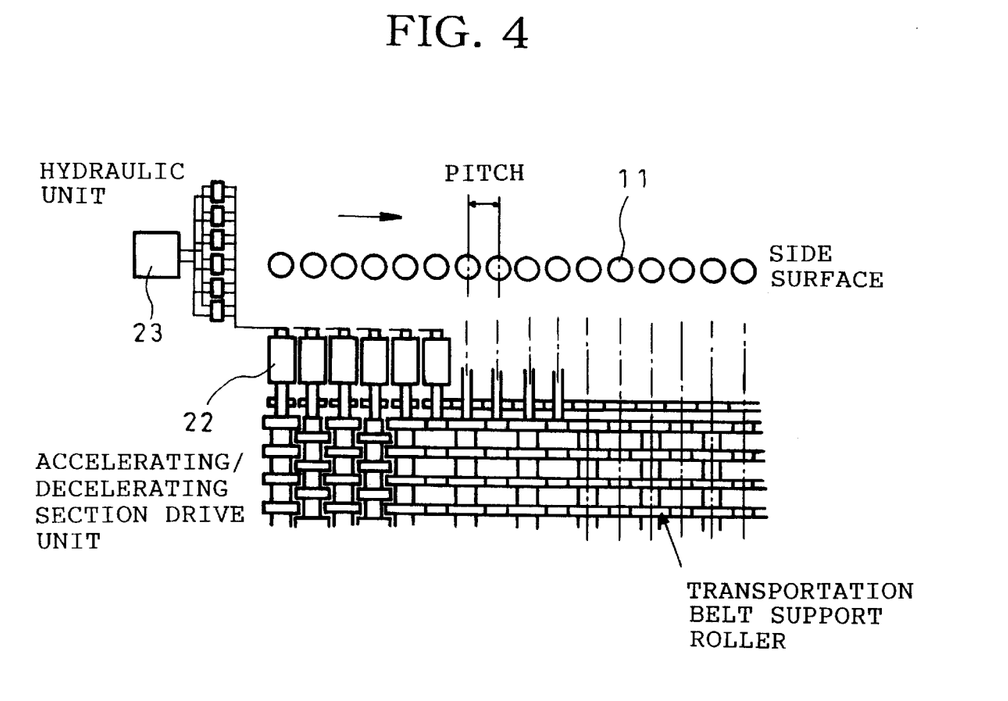
FIG. 4 is a partial plan view illustrating the array of accelerating rollers or the array of decelerating rollers.
Figure 5:
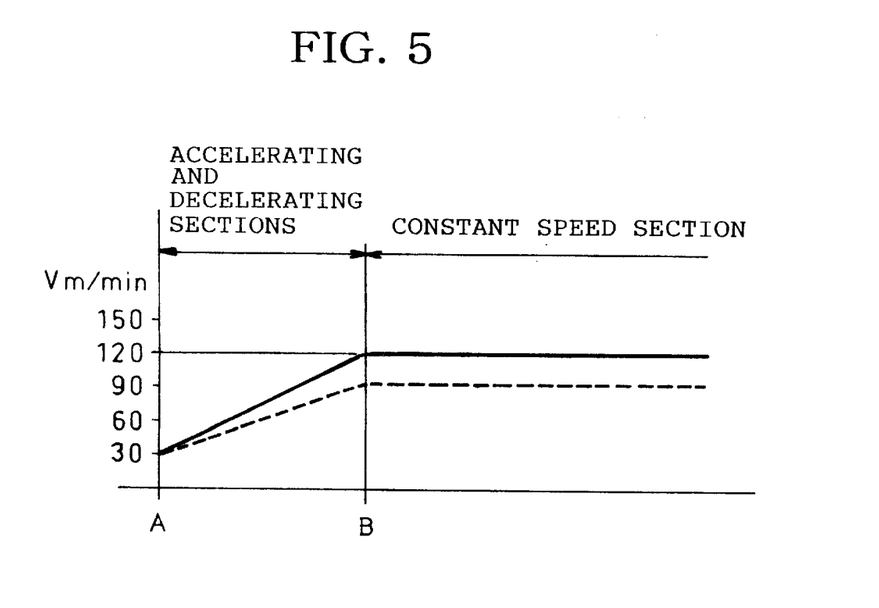
FIG. 5 is a view illustrating the speed distribution of the array of accelerating rollers or the array of decelerating rollers.

FIG. 4 is a partial plan view illustrating the array of accelerating rollers or the array of decelerating rollers of FIG. 3, and FIG. 5 is a view illustrating the speed distribution of the array of accelerating rollers or the array of decelerating rollers. The array of accelerating rollers 12 and the array of decelerating rollers 14 are different in that the former is for acceleration and the latter for deceleration, however, they have the same basic configuration. That is, as shown in FIG. 4, a plurality of horizontal drive rollers 11 in the acceleration and deceleration sections (in the accelerating section or in the decelerating section) are each rotated by a separate accelerating and decelerating section drive unit 22 (e.g., a hydraulic motor). In this example, a hydraulic unit 23 separately supplies pressure oil to each drive unit 22. Likewise, the horizontal drive rollers 11 in the constant speed section are also each driven by separate hydraulic units.

Each of the horizontal drive rollers 11 is arranged across the entire length of the variable-speed moving walkway and extends across the entire width of the variable-speed moving walkway that each passenger boards. Accordingly, the endless belt 16 is supported by the array of support rollers 10 to move continuously by the rotation thereof, however, the belt itself is not driven and thereby not subjected to a large tension. Incidentally, in the example shown in FIGS. 3 to 5, there are provided no rollers on the upper part of the belt, however, another upper array of rollers may be provided to drive only the widthwise end part of the belt as necessary.

As shown in FIG. 5, the rotational speed of each of the horizontal drive rollers 11 is gradually increased from a predetermined low speed (e.g., 30 m/min) to a predetermined high speed (e.g., 90 or 120 m/min) in the accelerating section, maintained a constant high speed (e.g., 90 or 120 m/min) in the constant speed section, and gradually decreased to a predetermined low speed (e.g., 30 m/min) in the decelerating section.

That is, in FIG. 5, each of the horizontal drive rollers 11 in the accelerating section is provided with a rotational speed corresponding to an accelerated speed at each point from point A to B. Incidentally, other than the foregoing example, the horizontal drive rollers 11 may employ a known drive method such as a drive method using a worm gear with different screw pitches.

Incidentally, the rollers in the constant speed section may be preferably driven by a separate power unit from those in the accelerating and decelerating sections. In addition, when the speed of the constant speed section is changed, by control or mechanical means, the speed of the constant speed section should be made consistent synchronously with the maximum speed set for the accelerating and decelerating sections. This configuration makes it possible to readily change the speed of the constant speed section.

Figure 6:
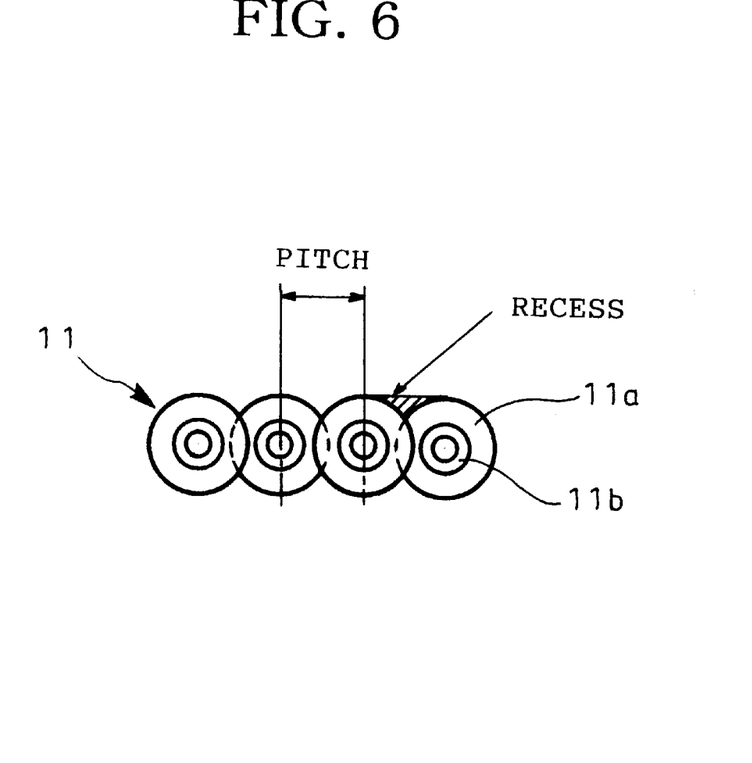
FIG. 6 is a partial side view illustrating horizontal drive rollers.
Figure 7:
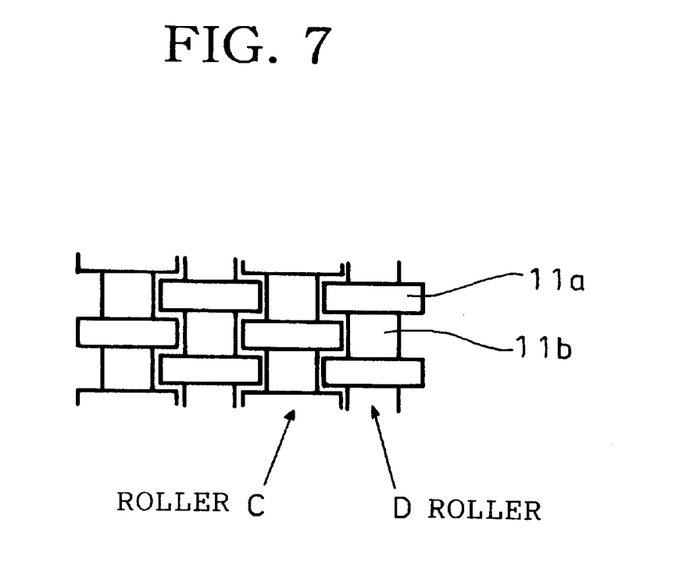
FIG. 7 is a partial plan view illustrating horizontal drive rollers.

FIG. 6 is a partial side view illustrating the horizontal drive rollers of FIG. 3, and FIG. 7 is a plan view illustrating the horizontal drive rollers. As shown in these figures, the horizontal drive rollers 11 have a plurality of increased-diameter parts 11a and a plurality of reduced-diameter parts 11b, arranged alternately in their axial directions. The increased-diameter part 11a has a larger diameter than the distance between the axial centers of adjacent rollers (the pitch) and the reduced-diameter part 11b has a smaller diameter. In addition, the horizontal drive rollers 11 have the increased-diameter parts 11a and the reduced-diameter parts 11b of adjacent rollers, alternately arranged in the direction of movement (in the right to left direction in the drawing).

That is, as shown in the figures, parts C (the increased-diameter part 11a) and parts D (the reduced-diameter part 11b) overlap each other and thereby combine the projected and recesses so as to reduce the distance between the axial centers (pitch) as much as possible and minimize the recesses formed between the rollers.

This configuration makes it possible to minimize the recesses formed between the upper surfaces of the rollers and thereby alleviate the uncomfortable footing caused by projected and recessed parts of the rollers.

Figure 8:
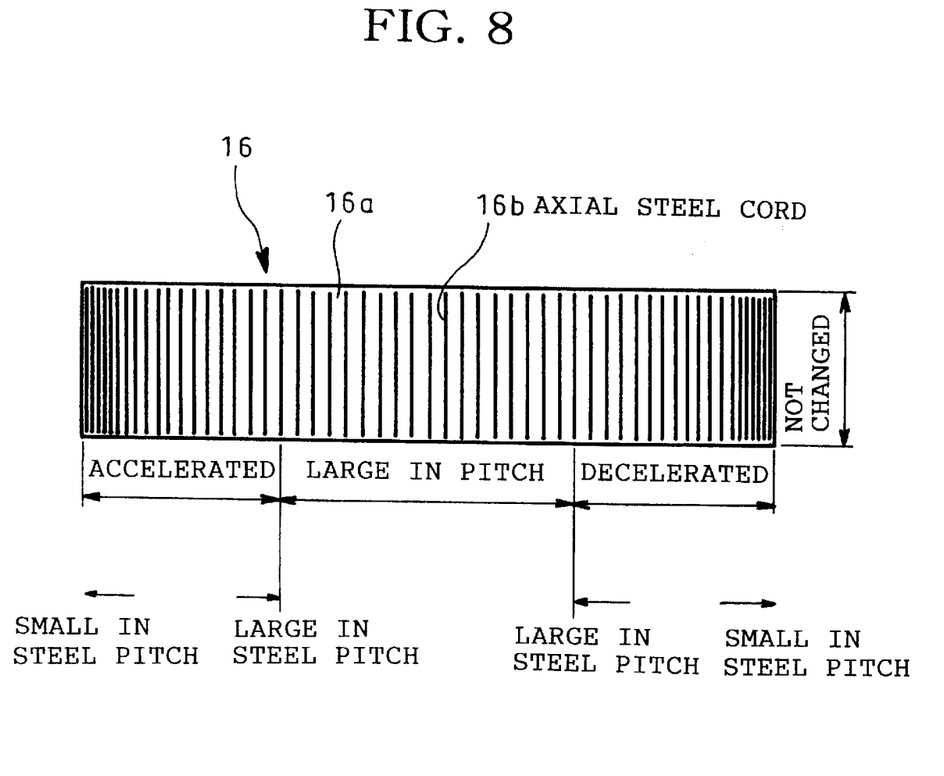
FIG. 8 is a plan view illustrating an example of an endless belt.
Figure 9:
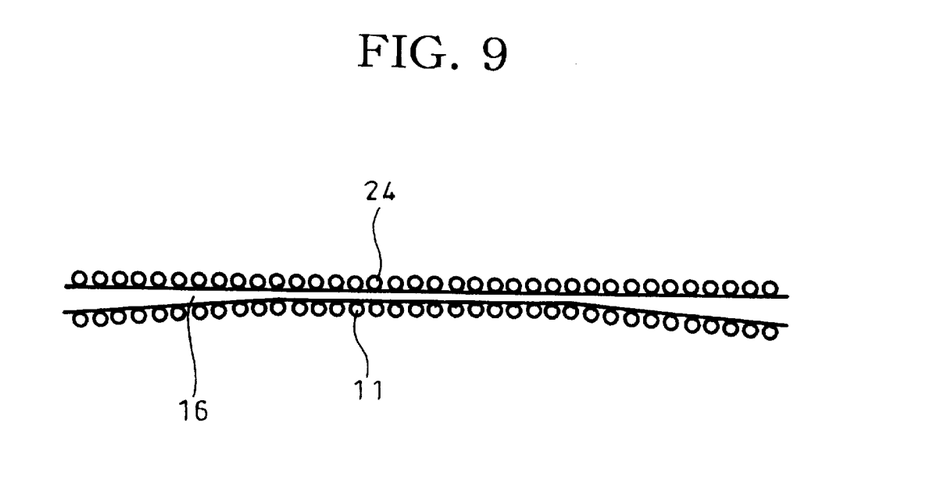
FIG. 9 is a partial side view illustrating the example of an endless belt.
Figure 10:
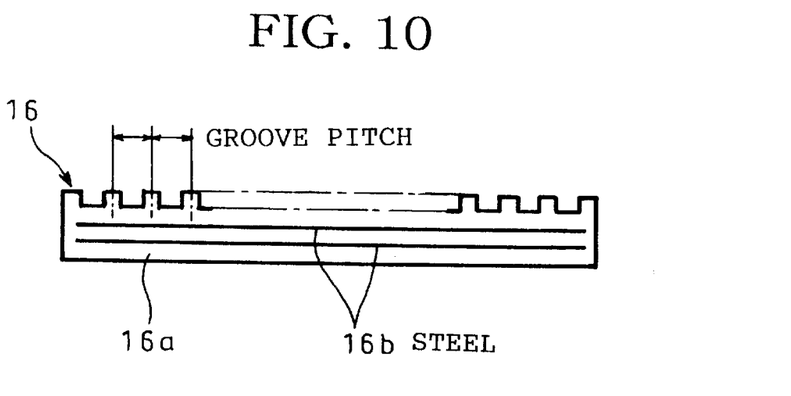
FIG. 10 is a cross-sectional view illustrating the example of an endless belt.

FIG. 8 is a plan view illustrating an example of an endless belt, and FIG. 9 is a side view illustrating the example of the endless belt. FIG. 10 is a cross-sectional view also illustrating the example of the endless belt of FIG. 8.

As shown in FIG. 9, in this examples, another upper array of rollers 24 is provided on the upper part of the belt. The upper array of rollers 24 is adapted to drive only the edge parts across the width of the endless belt 16 (on which the passenger does not step) to allow the belt to move smoothly. Incidentally, the upper array of rollers 24 is not inevitable and can be eliminated as required.

As shown in FIGS. 8 to 10, the endless belt 16 comprises elastic members 16a (e.g., rubber members) which are extended or retracted in the direction of movement in response to the rotational speed of the horizontal drive rollers 11, and rigid members 16b (e.g., metal members) which prevent the elastic members 16a from being extended and retracted in the direction of width. For example, steel cords that extend only in the direction of width may be employed as the rigid members 16b. This configuration allows the endless belt 16 to be readily extended and retracted in the direction of movement but hardly extended and retracted in the direction of width. Accordingly, in the example shown in FIGS. 8 to 10, the endless belt 16 is extended or retracted in response to the rotational speed of the horizontal drive rollers 11, becoming gradually thinner in thickness in the accelerating section, being maintained at a constant thin thickness in the constant speed section, and becoming gradually thicker in thickness in the decelerating section.

As shown in FIG. 10, the endless belt 16 is provided, on the upper surface thereof, with grooves that extend in the direction of running. These grooves are adapted to mate with a comb-shaped part provided on the edge parts of the entry and exit walkway platforms 21a, 21b, making it difficult for foreign matters to be sandwiched therebetween. While preventing extension and retraction in the direction of width by the rigid members 16b, this configuration allows the elastic members 16a to extend and retract, thereby making it possible to alleviate the sense of uncomfortable feeling which the passenger would otherwise have due to variations in speed.

Figure 11:
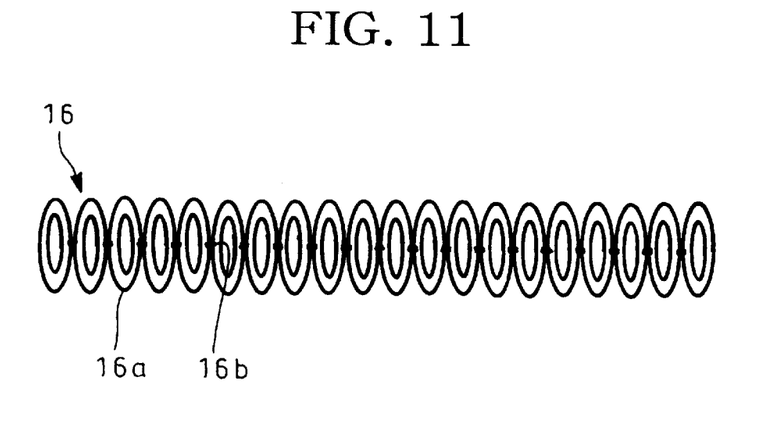
FIG. 11 is a aide view illustrating another example of an endless belt at a low-speed section.
Figure 12:
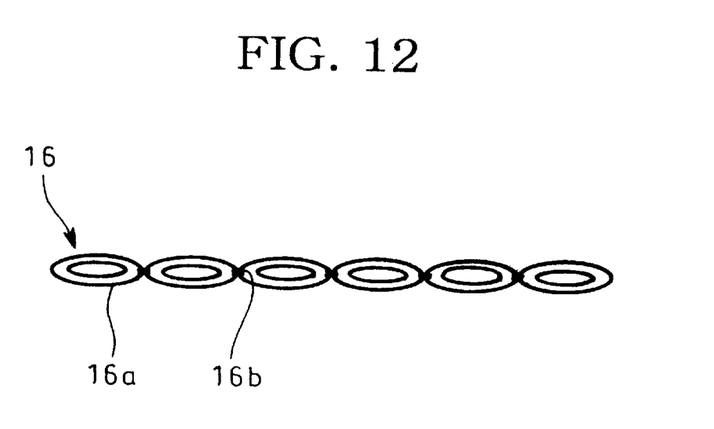
FIG. 12 is a side view illustrating the example of the endless belt at a high-speed section.

FIG. 11 is a side view illustrating another example of an endless belt at a low-speed section, and FIG. 12 is a side view illustrating the example of the endless belt at a high-speed section. Incidentally, these figures illustrate the endless belt extended in the high-speed section three times longer than in the low-speed section.

In this example, the endless belt 16 includes hollow elastic members 16a and rigid members 16b that connect the members 16a. The elastic members 16a are formed in a cylindrical shape in this example, however, for example, they may be formed in a rectangular shape in cross section or any other shape in the low-speed section. On the other hand, the elastic members 16a may be preferably provided, on the upper surface thereof, with grooves extending in the direction of running, as in FIG. 10. Furthrore, the rigid members 16b may be preferably formed of a strip plate or a shaped material extending in the widthwise direction.

This configuration allows the elastic members 16a to be freely extended or retracted in the direction of movement in response to the rotational speed of the horizontal drive rollers 11 without causing a serious change in cross section of the elastic members 16a.

On the other hand, the endless belt may be, for example, a flexible belt made of resin, configured to extend and retract freely in the direction of movement. Alternatively, the endless belt may be configured such that small pieces of resin or the like overlap one another like fish scales, allowing changes in their overlap width to cause extension and retraction of the belt.

The foregoing configuration of the present invention makes it possible to provide a low speed at the entry and exit sections and ensure a high level of safety by allowing the passenger to board the endless belt 16 at the low speed side of the array of accelerating rollers 12, across which the rotational speed gradually increases, and by allowing the passenger to alight from the endless belt 16 at the low speed side of the array of decelerating rollers 14, across which the rotational speed gradually decreases in contrast.

In addition, the endless belt 16 that moves at a high speed together with the array of high-speed rollers 13 can convey the passenger on board several times (e.g., two to three times) faster than the prior-art moving walkway except in the entry and exit sections. This makes the high speed transportation of passengers possible. Furthermore, the passenger boards not directly the array of support rollers 10 but the endless belt 16. In this way it is possible to prevent the passenger from being caught in between a plurality of horizontal drive rollers 11 and alleviating the uncomfortable footing caused by the projected and recessed parts of the rollers.

Figure 13:
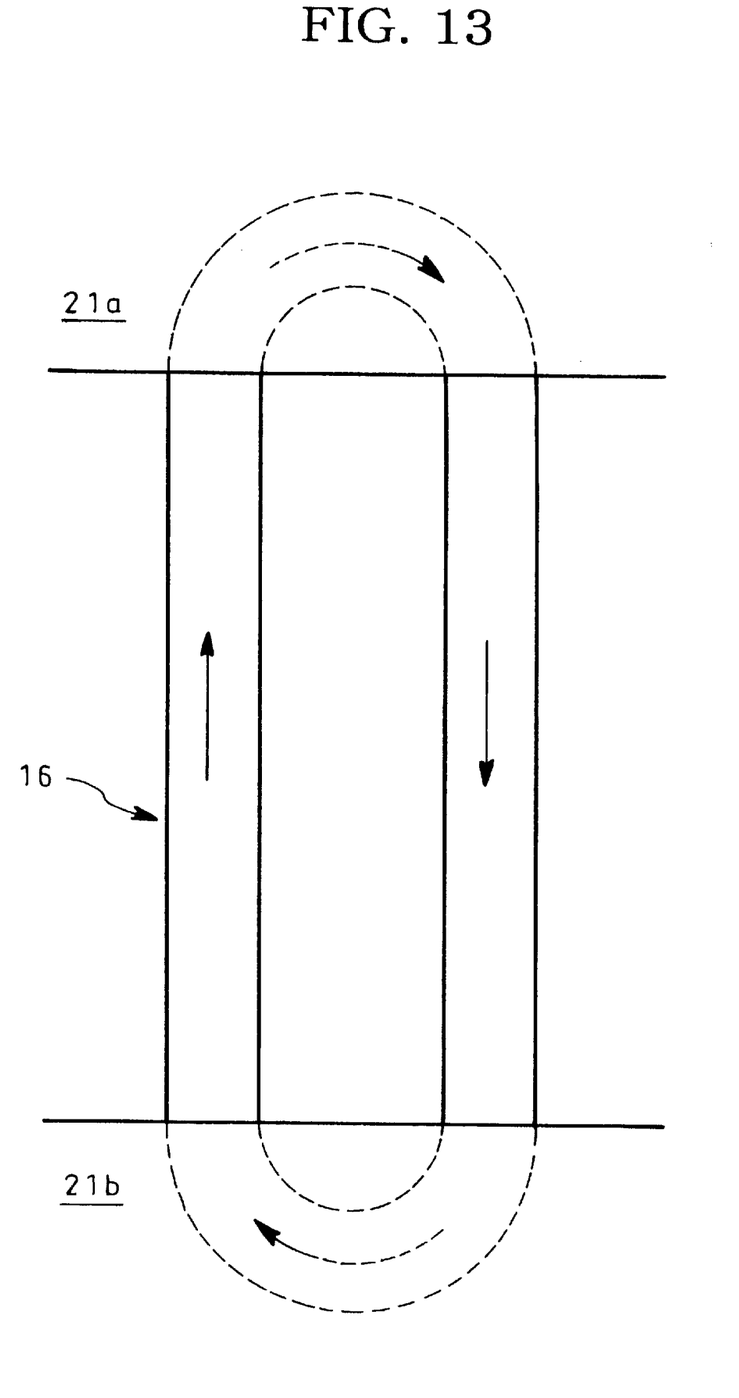
FIG. 13 is a view illustrating the overall configuration of a variable-speed moving walkway according to a second embodiment of the present invention.

FIG. 13 is a view illustrating the overall configuration of a variable-speed moving walkway according to a second embodiment of the present invention. Referring to FIG. 13, the endless belt 16 is allowed to rotate continuously in the horizontal direction. That is, the endless belt 16 has the left-hand side used as a go path and the right side used as a return path, and rotates horizontally beneath the entry and exit section walkway platforms 21a and 21b at both ends of the endless belt 16 (upper and lower ends in the drawing). This embodiment is the same as the first embodiment in that the endless belt 16 is supported by an array of support rollers (not shown) and moved by the rotation thereof.

In addition, the arrays of support rollers in the go and return paths include the array of accelerating rollers, the array of high-speed rollers, and the array of decelerating rollers like that described above. The horizontal drive rollers provide rotational speeds which gradually increase from a low speed, which are maintained at a constant high speed, and which gradually decrease to the low speed, respectively. In this case, like the first embodiment, the endless belt 16 extends or retracts in the direction of movement in response to the rotational speed of the horizontal drive rollers. In addition, at the horizontally rotating parts on both ends, the inner side is retracted and the outer side is extended. Incidentally, in the example shown in this drawing, the outer end speed is twice as high as the inner end speed.

This configuration allows the single endless belt 16 to be employed to constitute the go and return paths and the number of components for use in the whole assembly to be reduced, thereby making it possible to significantly reduce cost.

In addition, as can be seen clearly from this embodiment, the variable-speed moving walkway according to the present invention, being not limited to a straight walkway, can be provided with a curved part, or an inclined part and a spiral part as required.

Incidentally, the present invention is not limited to the afore-mentioned embodiments, and it is believed obvious that various modifications can be made in the present invention without departing from the spirit and scope thereof.

As described above, according to the present invention, passengers can be conveyed by the rollers provided on the surface of a lower frame without applying a transportation drive force to the belt, and a special belt is laid on the upper surface of the rollers across the entire length of the walkway, thereby making it possible to ensure safety for passengers' footing. That is, the variable-speed moving walkway according to the present invention provides a low speed at the entry and exit sections to thereby secure a high level of safety, and a high speed several times (e.g., two to three times) higher than that provided by the prior art walkway except in the entry and exit sections. This makes it possible to provide a high speed transportation as a whole. Furthermore, passengers board not directly the array of support rollers but the endless belt. In this way, the present invention provides, for example, superior affects that the passenger can be prevented from being caught in between a plurality of horizontal drive rollers and the sense of uncomfortable footing caused by the projected and recessed parts of the rollers can be alleviated.

What is claimed is:

1. A variable-speed moving walkway comprising;
    an array or support rollers (10) comprising a plurality of horizontal drive rollers (11), having upper surfaces arranged to be generally flush with each other and rotated about each axial center; and
    an endless belt (16), supported by said array of support rollers, for moving continuously by rotation thereof, wherein
    said array of support rollers are composed of an array of accelerating rollers (12), an array of high-speed rollers (13), and an array of decelerating rollers (14), and these rollers allow rotational speeds of the horizontal drive rollers to gradually increase from a low speed, to be maintained at a constant high speed, and to gradually decrease to a low speed, respectively, said endless belt being extended or retracted in the direction of movement in response to the rotational speed of the horizontal drive rollers.

2. The variable-speed moving walkway according to claim 1, wherein
    said endless belt (16) comprises elastic members (16a) for extending or retracting in a direction of movement in response to a rotational speed of horizontal drive rollers and rigid members (16b) for preventing the elastic members from extending or retracting in a widthwise direction, said endless belt being readily extendable and retractable in the direction of movement but barely extendable and retractable in the widthwise direction.

3. The variable-speed moving walkway according to claim 1, wherein the array of accelerating rollers, the array of high-speed rollers, and the array of decelerating rollers are arranged in that order, so that a passenger boards the endless belt on the array of accelerating rollers, moves on the endless belt on the array of high-speed rollers, and then alights from the endless belt on the array of decelerating rollers.

4. The variable-speed moving walkway according to claim 1, comprising:

an entry side drive pulley (17a), provided at a boarding side edge part of said array of accelerating rollers and rotated at the same speed as that of the horizontal drive rollers at the boarding side edge part;

an exit side drive pulley (17b), provided at an alighting side edge part of said array of decelerating rollers and rotatably driven at the same speed as that of the horizontal drive rollers at the alighting side edge part; and a pair of sustain rollers (18) to be rotated freely being pressed with a predetermined pressure by the entry and exit side drive pulleys, wherein said endless belt, while being sandwiched by the drive pulleys and the sustain rollers, rotates continuously between the entry and exit side drive pulleys.

5. The variable-speed moving walkway according to claim 1, wherein said horizontal drive rollers (11) have a plurality of increased-diameter parts (11a) and a plurality of reduced-diameter parts (11b), arranged alternately in their axial directions, the increased-diameter part (11a) having a larger diameter than a distance between axial centers of adjacent rollers and the reduced-diameter part (11b) having a smaller diameter, and the increased-diameter parts and the reduced-diameter parts of adjacent rollers are alternately arranged in the direction of movement.

* * * * *